United States Patent [19]
Compton

[11] 3,944,094
[45] Mar. 16, 1976

[54] WARP BEAM DOLLY

[76] Inventor: Ralph M. Compton, 4 Briarcreek Place, Greenville, S.C. 29607

[22] Filed: Jan. 8, 1975

[21] Appl. No.: 539,342

[52] U.S. Cl............... 214/390; 214/DIG. 4; 254/2 R
[51] Int. Cl.² ......................................... B60P 3/00
[58] Field of Search.......... 214/390, DIG. 3, DIG. 4; 254/2 R, 2 C

[56] References Cited
UNITED STATES PATENTS

| | | | |
|---|---|---|---|
| 3,404,794 | 10/1968 | Wilson | 214/390 X |
| 3,702,139 | 11/1972 | Chaffin | 214/390 |
| 3,877,548 | 4/1975 | Hernick | 187/8.49 X |

*Primary Examiner*—Robert G. Sheridan
*Attorney, Agent, or Firm*—Bailey & Dority

[57] ABSTRACT

Apparatus for supporting and transporting a warp beam and the like includes a pair of wheeled frame support members wherein each support member includes an upper horizontal platform and a lower transverse platform to form a crossframe with each platform having roller members carried thereon. The upper platform carries an upwardly extending housing thereon defining a horizontally extending slot in which a cradle member is slideably carried for receiving an end of the warp beam axle. The cradle member is moved up and down in the slot so as to raise and lower the warp beam. With a wheeled support member attached to each end of the warp beam, the beam may be transported to the various yarn processing stations.

9 Claims, 5 Drawing Figures

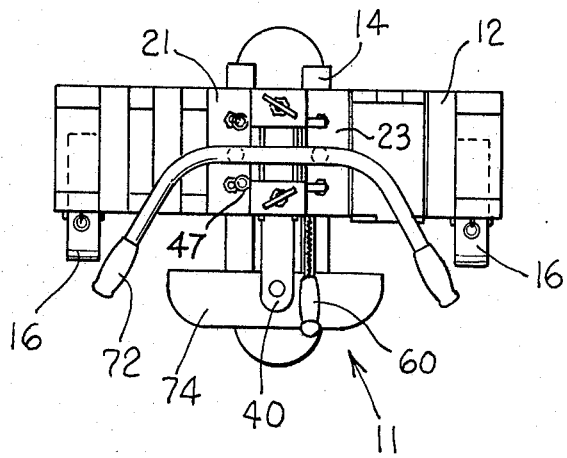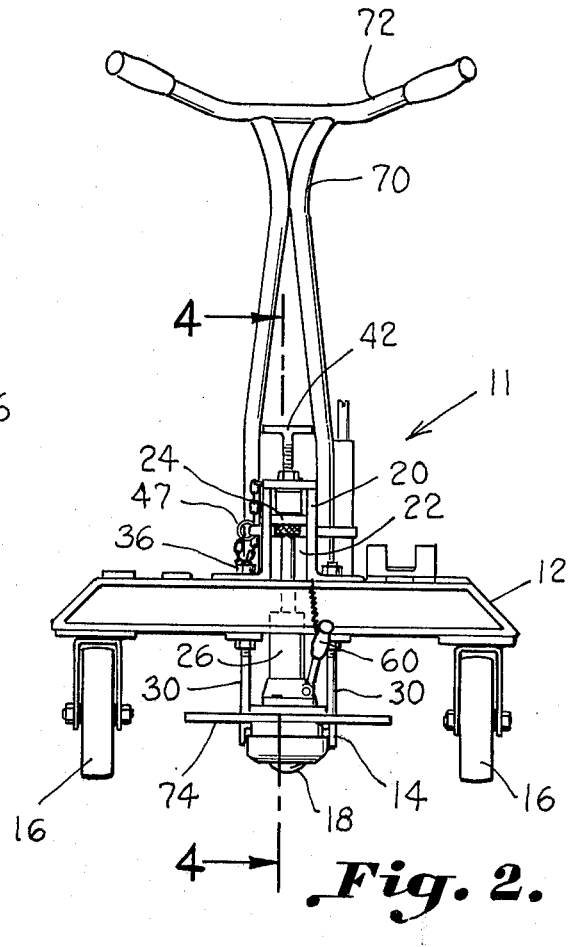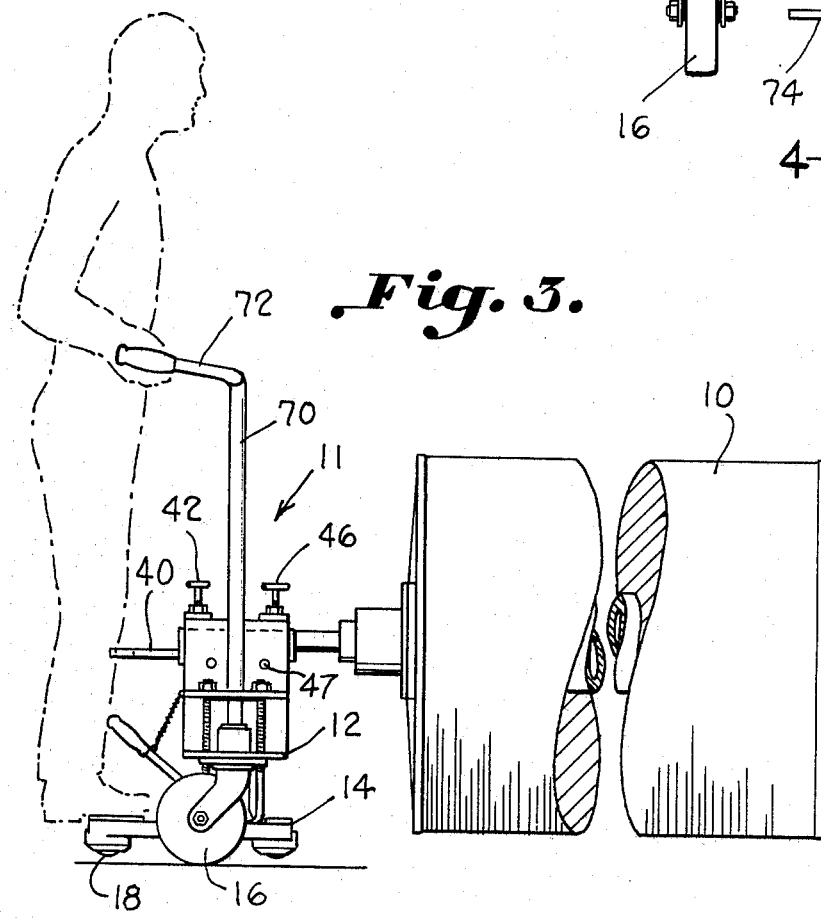

WARP BEAM DOLLY

BACKGROUND OF THE INVENTION

At the warping station in a cloth mill, yarn sheets are disposed upon a warp beam which is a large horizontal roll carried on its two protruding axle ends. Thereafter, the yarn is subject to several successive operations carried out at separate stations in the mill before being conveyed to the loom machine. The purpose of the warp beam is to allow the yarn to be wound and unwound at each station and to transport the yarn from one station to the next.

The diversity of the processing apparatus requires that the warp beam unwind at different levels of height and in transporting the warp beam it is often necessary to move along narrow passages between the machinery. Thus, it is necessary to have apparatus for handling and supporting the warp beam which is capable of raising and lowering the warp beam and of being highly maneuverable in narrow spaces. Since a full warp beam may weigh as much as 3,200 pounds, the wheeled support members must be of high structural strength to withstand such heavy loads daily.

Prior devices have been developed for handling and transporting warp beams such as disclosed in U.S. Pat. No. 3,574,907 wherein two rolling supports for the two warp beam axle-ends are provided. This device includes a rather elaborate series of linkage mechanisms and a wormed axle for raising and lowering the warp beam.

Other devices have been developed for supporting large rolls of carpet and the like such as shown in U.S. Pat. Nos. 3,702,139 and 3,638,817 wherein a pair of wheeled support members are provided for supporting the ends of an axle running through the center of the roll. However, it is doubtful that these support members provide the durability and structural strength that is necessary to handle and transport warp beams which weigh as much as 3,200 pounds.

SUMMARY OF THE INVENTION

An apparatus is provided for handling and transporting a warp beam and the like comprising a pair of wheeled frame support members wherein each of the support members includes a cross-frame bottom portion having an upper platform and a lower transverse platform with roller members carried thereon. The lower transverse platform is carried by and vertically spaced below the upper platform and prevents the support member from tipping over when standing alone. An upwardly extending housing is carried on the upper platform and defines a horizontally extending slot therein. A cradle member for receiving an end of a warp beam axle is slideably carried in the housing slot for vertical displacement therein, and means is carried on the lower platform engaging the underneath portion of the cradle member for raising and lowering the cradle member in the slot.

Accordingly, an important object of the present invention is to provide an apparatus for handling and transporting a warp beam and the like which is durable and compact and can be easily maneuvered in narrow passages.

Another important object of the present invention is to provide an apparatus for handling and transporting a warp beam which is of high structural strengh and can withstand the daily use of transporting heavy loads.

Another important object of the present invention is to provide an apparatus for handling and transporting a warp beam wherein the warp beam can be raised and lowered easily and simply to unwind the yarn at different levels at the various processing stations.

Another important object of the present invention is to provide an apparatus for handling and transporting a warp beam which is suitable for towing operations behind light weight tow vehicles.

Another important object of the present invention is to provide an apparatus for handling and transporting a warp beam wherein an attendant may position himself on the apparatus so as to be transported with the warp beam.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a top plan view illustrating a wheeled supporting member constructed in accordance with the present invention for supporting one end of a warp beam axle, FIG. 2 is a rear elevational view of the support member shown in FIG. 1, FIG. 3 is a side elevational view illustrating a pair of wheeled support members constructed in accordance with the present invention for supporting the two axle-ends of a warp beam for transportation.

DESCRIPTION OF A PREFERRED EMBODIMENT

Figures 4, 5:
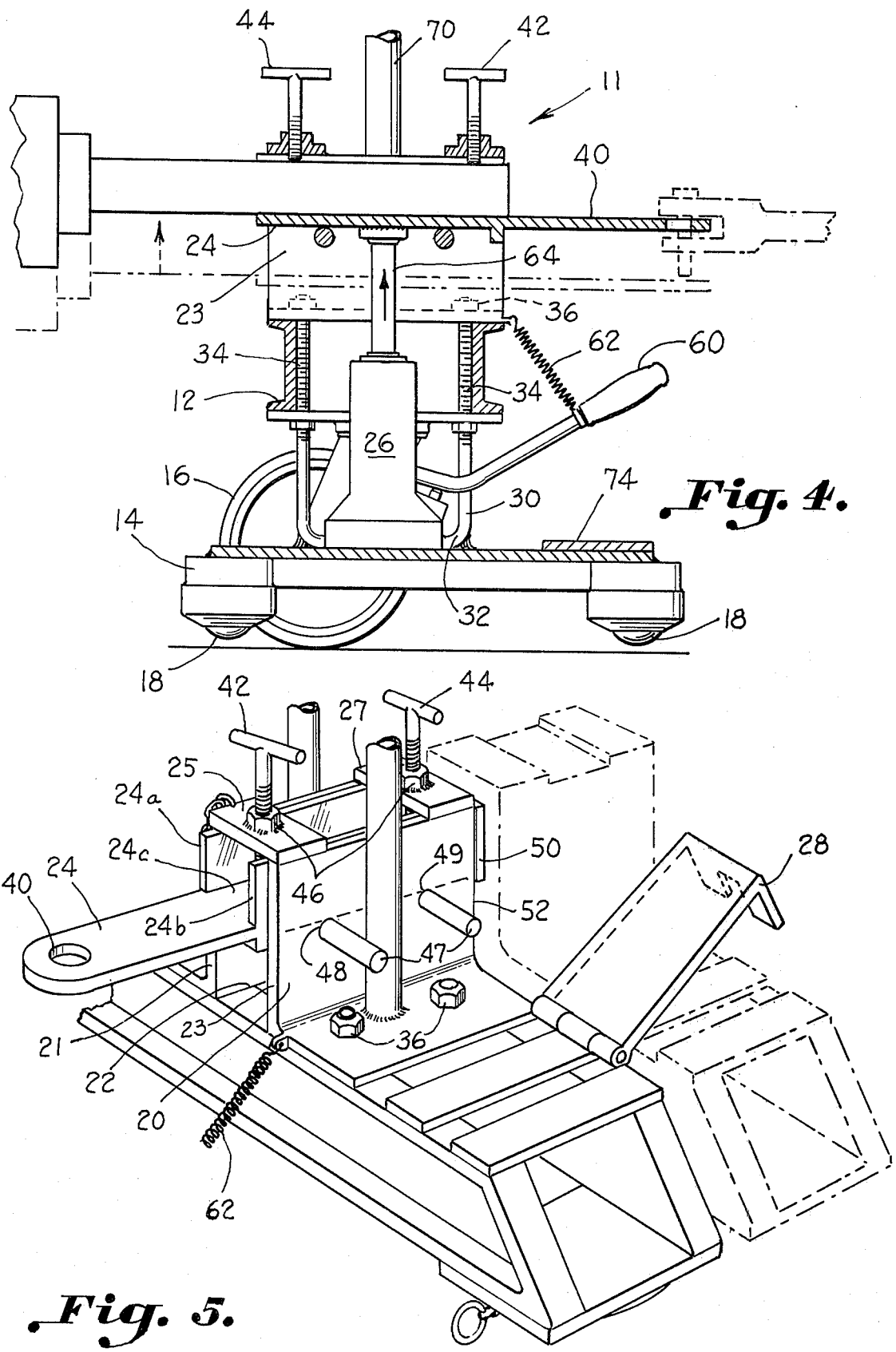
FIG. 4 is a sectional view taken along the line 4—4 of FIG. 2.
FIG. 5 is a perspective view illustrating a pair of wheeled support members constructed in accordance with the present invention which are coupled together for storage purposes.

The drawings illustrate an apparatus for handling and supporting a warp beam 10 and the like comprising a pair of wheeled frame support members wherein each of the support members, designated generally as 11, includes a cross-frame bottom portion having an upper platform 12 and a lower transverse platform 14 with roller members 16 and 18, respectively, carried thereon. The lower transverse platform is carried by and spaced vertically below the platform and an upwardly extending housing 20 is carried on the upper platform defining a horizontally extending slot 22 therein. A cradle member 24 for receiving an end of a warp beam axle is slideably carried in the slot for vertical displacement therein. A means 26 is carried on the lower platform engaging a surface of the cradle member for raising and lowering the cradle member in the slot. When the two support members are attached to the ends of the warp beam axle, so as to support the warp beam above the floor surface, the warp beam may be transported by a tow vehicle and the like. Each of the wheeled support members 11 is identical except for the coupling latch 28 which is hinged to one of the support members for coupling the members together during storage.

The upper platform 12 and the lower transverse platform 14 define a cross-frame bottom portion having a general configuration of a cross thereby preventing the support member from tipping over when standing alone. The upper platform 12 carries a pair of wheels 16 which swivel and they may also be locked in position. The lower transverse platform 14 carries a pair of ball roller casters 18 for multi-directional movement. When the support members are in a vertically upright position, as for example when attached to the ends of the warp beam axle, the roller members of the lower platform will be out of contact with the floor surface. Thus, the rolling force will be concentrated on the two large hard rubber wheel members 16 carried by the upper platform, as is apparent in FIG. 3.

The lower transverse platform is carried by and spaced vertically below the upper platform and is attached thereto by a pair of substantially U-shaped bolt members 30 having a bottom portion 32 welded to the lower platform and a pair of vertical legs 34 which pass through openings in the upper platform member and are fastened thereto in any suitable manner as by nut means 36.

The upwardly extending housing 20 includes a pair of L-shaped flanges 21 and 23 with the vertical leg of the flange members defining vertical sides of the housing. The horizontal leg of the flange members are made integral with the upper platform as by welding and the like. The flange members are further secured to the platform by the bolt legs 34 passing therethrough with the nut means 36 fastened in place. The housing is completed by two top plates 25 and 27 which bridge the top of the vertical sides. The housing defines a horizontally extending slot 22 formed therein. The cradle member 24 is open topped and is slideably received in the slot for vertical displacement therein. The cradle member is provided with a tongue member 40 which can be coupled to a suitable towing vehicle for transporting the warp beam supported therein. A locking means is provided by a pair of turnscrew members 42 and 44 carried on top of the housing and extending therethrough into the open top of the cradle member for engaging against an upper surface of the warp beam axle when the cradle member is raised to its uppermost position thereby locking the axle end in place. The turnscrew members are received in threaded nut means 46 so that they may be tightened against the axle end. A pair of locking pins 47 are received through holes 48 and 49 in each side of housing 20 across the underneath portion of the cradle members for supporting and locking the cradle in its uppermost position.

The cradle member 24 is open topped and includes a pair of vertical parallel side members 24a and 24b. The cradle has a bottom portion 24c made integral with the side members as by welding and the like which is extended at one end to provide tongue member 40. The end of the cradle member 24 opposite the tongue member is provided with outwardly extending abutment flanges 50 for engaging the outer face 52 of the vertical sides of the housing so that when the tongue member is coupled to a tow vehicle during towing operations, the cradle member will pull against the housing thus moving the support member.

As best seen in FIG. 4, the means 26 for raising and lowering the cradle member and thus the warp beam in a preferred embodiment is a hydraulic jack. The jack operates in a conventional manner by pumping the handle 60 against the light spring 62. The piston rod 64 of the jack engages the underneath surface of the cradle member to raise and lower it in the slot. A mechanical jack or other means such as an air motor and a supply of compressed air could be suitably used to raise and lower the cradle member.

Each of the wheeled support members 11 includes a vertical bar member 70 carried by the upper platform and made integral therewith as by welding, which terminates in a handle-bar assembly 72. A footplate 74 is carried by the lower platform 14 whereby an attendant may be supported and positioned on the wheeled support member during transportation of the warp beam.

In use, a wheeled support member is attached to each of the two ends of the warp beam axle and then the jack means is used to raise the axle off of the machine support upon which it is resting. The support members and warp beam are then moved laterally away from the machinery and once the machine is cleared, the warp beam may be moved forwardly and backwardly down the narrow passages between machinery to transport the warp beam roll to the next processing station. At the next processing station, the warp beam is stopped alongside the yarn processing machinery and then moved laterally until the roll is over the machine support, the warp beam roll can then be lowered onto the machine support. The wheeled support members constructed in accordance with the present invention are durable and compact having a dimension less than that of the width of a full warp beam so that the warp beam may be maneuvered in and out of narrow passages. The compact and durable structure of the wheeled support member constructed in accordance with the present invention has been found to be highly efficient for moving warp beams in cloth mills and could be used for many similar purposes where material, wrapped or mounted around a central axle beam, needs to be transported.

While a preferred embodiment of the invention has been described using specific terms, such description is for illustrative purposes only, and it is to be understood that changes and variations may be made without departing from the spirit or scope of the following claims.

What is claimed is:

1. Apparatus for supporting and transporting a warp beam and the like comprising:
   a. a pair of wheeled frame support members;
   b. each of said support members including:
      i. a cross-frame bottom portion having an upper platform with roller members carried thereon,
      ii. a lower transverse platform having roller members carried thereon carried by and spaced vertically below said upper platform,
      iii. an upwardly extending housing carried on said upper platform defining a horizontally extending slot therein,
      iv. a cradle member for receiving an end of a warp beam axle slideably carried in said slot for vertical displacement; and
      v. means carried on said lower platform engaging a surface of said cradle member for raising and lowering said cradle member in said slot; and
   said support members being attached to the ends of the warp beam axle so as to support the warp beam above the floor surface permitting the warp beam to be transported.

2. The apparatus of claim 1 wherein said support members each further include locking means carried on the top of said housing for engaging the warp beam axle when inserted in said cradle and raised to an uppermost position for securing the warp beam axle in said housing.

3. The apparatus of claim 2, wherein said locking means comprises at least one turn-screw member threadably received in the top of said housing extending into said slot for engaging a surface of the warp beam axle.

4. The apparatus of claim 1 wherein said cradle member includes a tongue member extending away from said housing adapted to be coupled to a tow vehicle for transporting the warp beam.

5. The apparatus of claim 4 wherein said cradle member further includes an abutment surface on an end opposite said tongue member for abutting an outside wall surface of said housing so as to permit pulling of said support member and prevent removal of said cradle member during transporting operations.

6. The apparatus of claim 1 wherein each support member includes lock pin members received through holes in said housing extending across an underneath portion of said cradle member when raised to an uppermost position for locking said cradle member in said position.

7. The apparatus of claim 1 wherein said means for raising and lowering said cradle member comprises jack means.

8. The apparatus of claim 1 wherein said means for raising and lowering said cradle member comprises an air motor connected to a source of compressed air.

9. The apparatus of claim 5 wherein said support members each further include a vertically extending bar member carried by said upper platform terminating in a handle-bar assembly and a foot plate carried transversely across said lower platform so that a passenger may position himself on said support member during transporting operations.

* * * * *